United States Patent [19]
Tsubai et al.
[11] 4,238,279
[45] Dec. 9, 1980

[54] COMPOSITIONS AND METHODS FOR TREATING SURFACE OF LITHOGRAPHIC PRINTING PLATES

[75] Inventors: Yasuo Tsubai; Toshiro Kondo, both of Nagaokakyo, Japan

[73] Assignee: Mitsubishi Paper Mills, Ltd., Tokyo, Japan

[21] Appl. No.: 944,070

[22] Filed: Sep. 20, 1978

[30] Foreign Application Priority Data

Nov. 16, 1977 [JP] Japan ................................ 52-136727

[51] Int. Cl.$^3$ ........................ B41M 1/00; B41M 5/00; C09D 5/20; C23F 1/00

[52] U.S. Cl. .................................... 156/664; 101/451; 101/465; 106/2; 156/905; 252/79.2; 252/79.4

[58] Field of Search ..................... 252/79.2, 79.4, 142, 252/145, 155; 101/451, 465; 156/664-666, 905; 96/36.3; 106/2; 430/300-302

[56] References Cited

U.S. PATENT DOCUMENTS

| | | | |
|---|---|---|---|
| 2,393,875 | 1/1946 | VanDusen | 101/451 |
| 2,705,191 | 3/1955 | Jumeh | 252/79.2 X |
| 3,575,747 | 4/1971 | Cohn | 156/665 X |
| 3,645,790 | 2/1972 | Burden | 252/142 X |
| 3,829,319 | 8/1974 | Suzuki et al. | 106/2 |
| 4,100,096 | 7/1978 | Rubin | 252/145 |

FOREIGN PATENT DOCUMENTS

| | | |
|---|---|---|
| 47-5123 | 2/1972 | Japan . |
| 437127 | 10/1935 | United Kingdom . |

*Primary Examiner*—William A. Powell
*Attorney, Agent, or Firm*—Cushman, Darby & Cushman

[57] ABSTRACT

A liquid composition for treating surface of lithographic printing plates, especially etching liquid and dampening liquid which essentially consists of (a) phosphoric acids, (b) nitric acid or salts thereof and (c) nitrous acid or salts thereof and which has all characteristics required for treating liquids used for offset printing, has excellent ability of rendering the non-image areas oil-unreceptive and has rust resistance for all metals. This composition may additionally contain aminopolycarboxylates, polyol compounds and inorganic fine particles.

18 Claims, No Drawings

COMPOSITIONS AND METHODS FOR TREATING SURFACE OF LITHOGRAPHIC PRINTING PLATES

BACKGROUND OF THE INVENTION

The present invention relates to a composition for treating lithographic printing plates and more particularly it relates to an etching liquid for rendering non-image areas oil-unreceptive and dampening liquid. The normal lithographic printing is accomplished by applying both water and an ink to the surface of printing plates so that the image areas selectively accept a coloring ink and the non-image areas selectively accept water and then transfering the ink on the image areas to a substrate such as paper. Therefore, in order to obtain excellent prints it is necessary that the difference between oleophilicity of image areas and hydrophilicity of non-image areas is sufficiently great and when water and an ink are applied to the surface of printing plates the image areas accept sufficient amount of ink and the non-image areas accept no ink. For this purpose, various methods for rendering the plates oil-unreceptive have been proposed depending on the kind of the plate materials and printing processes. That is, hitherto, as the lithographic printing plates there have been used presensitized plates (PS plates) having a support of metals such as aluminum, etc.; printing plates obtained by using electrophotography (e.g., electrofax); master papers which comprises a substrate of paper on which a pigment is coated together with a binder; plates produced by photographical method which uses silver salt diffusion method as disclosed in Japanese Patent Publication No. 30562/73, etc. Various treating liquids for oil-unreceptive the non-image areas of such printing plates are sold, but many of these treating liquids are usable for only specific printing plates and no etching liquids and dampening liquids satisfactorily and equally usable for various printing plates have been known.

Some of proposals have been made as such kind of treating liquids, but none of them satisfy overall conditions in lithographic printing. In general, treating liquids used in offset printing are required to have the following characteristics.

(1) They can render the non-image areas sufficiently oil-unreceptive so that no ink stick to the non-image areas.

(2) They do not damage ink-receptivity of image areas.

(3) They do not accelerate emulsification of ink.

(4) They have no corrosive action on printing 20 machines and metal portions of printing plates.

(5) They are stable against heat and light for a long time.

(6) They do not rot.

(7) They do not deteriorate printability of printing plates.

(8) They can be used effectively regardless of kind of printing plates, kind of inks and kind of printing substrate (e.g., paper).

The inventors already proposed such treating liquids as satisfy the above requirements in Japanese Patent Publications Nos. 29723/73, 15762/76, 15763/76 and 29441/76 and Japanese Patent Laid-Open Application No. 36402/74. However, most of the etching liquid or dampening liquids proposed hitherto including those proposed by the inventors are effective only for the specific printing plates as mentioned above and besides they are mostly improved in the above requirements (1), (2), (3), (5) and (7) among those (1)-(9) and very few of them take into account the corrosion action of the requirement (4), namely, rust preventing property and the rot of the requirement (6), namely, the mold growing in the treating liquids. The etching liquids or dampening liquids now proposed or practically used have more or less these defects. For example, Japanese Patent Publication No. 5123/72 discloses a treating liquid which comprises (a) an alkali metal polyphosphate, (b) phosphoric acid or citric acid and (c) a sodium or potassium nitrate, perchlorate, permanganate or persulfate, for the purpose of rust prevention of printing plates using a support of aluminum, zinc or a stainless steel. However, this treating liquid has the rust preventing effect on only specific metals and has no sufficient inhibiting effect against rot.

Lithographic printing plates are made from various materials such as iron, aluminum, aluminum alloys, copper, other metals and alloys thereof, plastics, rubbers, etc. Especially, container for dampening liquid and container for etching liquid which is recently used in completely automatic operation of from plate making to plate treating and printing are made of various metals and so they inevitably undergo corrosion. Furthermore, the metallic portions of printing machines are always under the conditions of being corroded, e.g., corrosions of the portions of the printing machines due to scatter of treating liquids or inclusion of etching liquid into container for dampening liquid during printing. Besides, even the printing plates per se which have a metallic support are also corroded.

SUMMARY OF THE INVENTION

One object of the present invention is to provide an etching liquid or dampening liquid composition which meet all characteristics required as treating liquids used for offset printing.

Another object of the present invention is to provide a treating liquid composition which has an excellent ability for rendering oil-unreceptive, does not rot and has rust preventing effect on all metals.

Still another object of the present invention is to provide a liquid composition for treating surface of printing plates which utilize surface metallic silver images formed by silver salt diffusion transfer method and rendered ink-receptive which prevents corrosion and deterioration of the surface silver and provides excellent printability.

Other objects of the present invention will be apparent from the following description of the invention.

DESCRIPTION OF THE INVENTION AND THE PREFERRED EMBODIMENTS

As the result of the inventor's extensive researches, it has been found that the above objects can be accomplished by a treating liquid which consists essentially of three components.

The present invention relates to a lithographic printing plate treating composition which consists essentially of (a) phosphoric acids, (b) nitric acid or salts thereof and (c) nitrous acid or salts thereof. Examples of the phosphoric acid are o-phosphoric acid, pyrophosphoric acid, hypophosphoric acid, phosphorous acid, sodium polyphosphate, sodium tripolyphosphate, sodium hexametaphosphate, trimetaphosphoric acid, tetrametaphosphoric acid, sodium tetraphosphate, ammonium phosphate, alkenylphosphoric acids (e.g., vinylphosphoric acid), alkylphosphoric acids (e.g., methylphosphoric acid) and the like. Among them, o-phosphoric acid, pyrophosphoric acid, hexametaphosphates and phosphorous acid are preferred. These may be used alone or in combination of two or more.

Examples of nitric acid or salts thereof are nitric acid, sodium nitrate, potassium nitrate, cobalt nitrate, nickel nitrate, zinc nitrate, aluminum nitrate, ammonium nitrate, chloromolybdenum nitrate, calcium nitrate, chromium nitrate, cerium nitrate, thallium nitrate, iron nitrate, copper nitrate, lead nitrate, manganese nirate, magnesium nitrate, rhodium nitrate and other water soluble metal nitrates.

Examples of nitrous acid or salts thereof are nitrous acid, ammonium nitrite, sodium nitrite, potassium nitrite, calcium nitrite, cobalt sodium nitrite, cobalt potassium nitrite, cesium nitrite, cerium nitrite, nickel nitrite, copper nitrite, barium nitrite, magnesium nitrite, lithium nitrite, thallium nitrite, rubidium nitrite and the like, among which alkali or alkaline earth metal salts of nitric acid are preferred.

The treating liquid composition of the present invention which consists essentially of the components (a)-(c) requires at least one component of each of the components (a)-(c) and if even one of components (a)-(c) is omitted, the objects of the present invention cannot be accomplished.

It is most preferred to adjust the pH value of the treating composition to about 4.0-6.5.

In the case of using the composition as a dampening liquid, content of (a) phosphoric acid is at least about 0.1 g/l and that of (b) nitric acid or salt thereof and that of (c) nitrous acid or salt thereof are at least about 0.01 g/l, respectively. Preferably, content of (a) is about 0.1 g/l—about 10 g/l and those of (b) and (c) are about 0.01 g/l—about 5 g/l, respectively. When this dampening liquid is used as etching liquid, the concentration of each component of the dampening liquid is concentrated to about 2-about 10 times.

These concentrations of the components in said dampening liquid or etching liquid depend on the kind of printing plate, the kind of inks or printing conditions (kind of printing machines, weather conditions during printing, etc.) and cannot be shown in clear ranges.

The treating liquid composition of the present invention is preferably blended with the conventional materials such as accelerators for rendering oil-unreceptive, buffers, preservants, wetting agents, etc. to change its treating activity. For example, dampening liquid or etching liquid which completely satisfy the objects of the present invention can be obtained by adding one or more of gum arabic, carboxymethylcellulose, sodium alginate, polyvinylpyrrolidone, polyvinylimidazole, copolymer of methylvinyl ether and maleic anhydride, carboxymethyl starch, ammonium alginate, methylcellulose, sulfates (such as sodium sulfate, ammonium sulate, etc.), tannic acid, polyol compounds having at least 2 hydroxy groups (such as polyethylene glycol, propylene glycol, pentaerythritol, glycerol, diethylene glycol, hexylene glycol, etc.), organic weak acids (such as citric acid, succinic acid, tartaric acid, adipic acid, ascorbic acid, propionic acid, etc.), inorganic fine particles, (colloidal silica, alumina, etc.), polyacrylic acids, ammonium bichromate, chrome alum, propylene glycol ester of alginic acid, aminopolycarboxylate (such as sodium ethylenediaminetetraacetate, etc.), surfactants, etc.

Besides, water miscible organic solvents such as methanol, ethanol, n-propyl alcohol, iso-propyl alcohol, dimethylformamide, dioxane, etc. and coloring agents such as phthalocyanine dyes, malachite green, ultramarine, etc. considering the discrimination and appearance of the solution may be added in a very small amount.

Especially when an aminopolycarboxylate is added to said components (a)-(c) of the present treating liquid composition, rust prevention and mold prevention effects can be further increased. Addition of the aminopolycarboxylate in an amount of about 0.01-about 5 g/l is sufficient in the case of etching solution.

One preferred embodiment of the present treating liquid composition comprises o-sodium phosphate, sodium nitrate, sodium nitrite, a polyol compound and inorgaic fine particle. Another preferred embodiment comprises (a) at least one selected from o-phosphoric acid, pyrophorphoric acid, hexametaphosphates, and phosphorous acid, (b) at least one of nitric acid and its salts, (c) at least one of nitrous acid and its salts, (d) an aminopolycarboxylate, (e) at least one polyol compound and (f) inorganic fine particles. Still another preferred embodiment comprises (a) phosphoric acids, (b) nitric acid or its salt, (c) nitrous acid or its salt, (d) an aminopolycarboxylate, (e) a polyol compound, (f) inorganic fine particles, (g) an alkali metal salt (such as sodium sulfate, etc.) other than (b) and (c) and (h) an organic weak acid.

These preferred compositions of the present invention are especially effective as dampening liquid for lithographic printing plates having metallic silver areas having ink-receptivity and hydrophilic colloid layer (e.g., gelatin) having ink-repellency which is produced by silver salt diffusion process as disclosed in, e.g., Japanese Patent Publication No. 30562/73 and furthermore such compositions can improve printability of the printing plates by preventing corrosion of the metallic silver of the plates.

In case the treating liquid composition of the present invention is used for other lithographic printing plates such as PS printing plates, if necessary, other components can be added to the components (a)-(c) to suitably modify the ability of rendering oil-unreceptive and selection of such other components or determination of amount of the components can be made by simple tests for one skilled in the art depending on the kind of printing plates.

The following examples are intended to illustrate the present invention but not to limit it in any way.

EXAMPLE 1

This example shows experiments on rotting (growing of mold) and corrosion of metals (rust). The experimental method was as follows:

Mold test : The liquid was diluted to 10 times and the degree of growing of mold was examined after lapse of one week.

Rust test: Aluminum and iron rods were dipped in the solutions which were diluted to 10 times and were in glass vessels and rust which appeared on the metal rods was examined.

Standard for judging the results:

"O" shows that no mold and no rust appeared.

"Δ" shows that some mold and rust appeared.

"X" shows that much mold and rust appeared.

Composition of the treating liquids and experimental results are shown in Table 1. Amount of each compound is shown by g/l. PH of the liquids was adjusted to 5.5 with sodium hydroxide.

Table 1

| Treating liquid No. | | 1 | 2 | 3 | 4 | 5 | 6 | 7 | 8 |
|---|---|---|---|---|---|---|---|---|---|
| o-Phosphoric acid | | 10 | — | — | 10 | 5 | 5 | 10 | — |
| Pyrophosphoric acid | | — | 10 | — | — | — | — | — | — |
| Sodium hexametaphosphate | | — | — | 10 | — | 5 | 5 | — | — |
| Nitric acid | | — | — | — | 5 | 5 | 5 | — | — |
| Nickel nitrate | | 5 | 5 | 5 | — | — | — | — | 5 |
| Sodium nitrite | | 5 | 5 | 5 | 5 | 5 | — | 5 | 5 |
| Citric acid | | — | — | — | — | — | — | — | 10 |
| Carboxymethylcellulose | | 4 | 4 | 4 | 4 | 4 | 4 | 4 | 4 |
| Glycerine | | 100 | 100 | 100 | 100 | 100 | 100 | 100 | 100 |
| Judgement | Rust Aluminum | O | O | O | O | O | O | x | Δ |
| | Iron | O | O | O | O | O | x | Δ | Δ |
| | Mold | O | O | O | O | O | x | Δ | Δ |
| | | The present invention | | | | | | Not the present invention | |

EXAMPLE 2

The experiments of Example 1 were repeated except that o-phosphoric acid of the treating liquid No. 1 was replaced by the same amount of phosphorous acid, hypophosphoric acid, tripolyphosphoric acid, metaphosphoric acid and ammonium phosphate, respectively. The same results as those of Example 1 were obtained.

EXAMPLE 3

A high speed green sensitive silver chlorobromide gelatin emulsion was coated on a paper support both sides of which were coated with polyethylene resin and was dried. Then, palladium sulfide sol prepared in the following manner was coated on said emulsion layers by a dipping method at a rate of 5 m/min.

| | | | |
|---|---|---|---|
| Liquid A: | $PdCl_2$ | 5 | g |
| | HCl | 40 | ml |
| | Water | 1 | l |
| Liquid B: | $Na_2S$ | 8.6 | g |
| | Polyethylene glycol | 8.6 | g |
| | Alkyl ether (10%) | 30 | ml |
| | Water | 1 | l |
| Liquid C: | Methylvinyl ether - Maleic anhydride copolymer (1.25%) (Gantrez AN prepared by GAF (Co.) | 100 | ml |

Liquid A and Liquid B were mixed with agitation and then Liquid C was mixed therewith.

An original was enlarge-copied by a platemaking camera using thus obtained sheet and then this was treated with a MITSUBISHI HISHIRAPID developing solution (a treating solution for silver complex diffusion transfer) by a HISHIRAPID processer.

To the whole surface of thus obtained lithographic printing plates was applied the following etching liquid [E] described in Example 6 of Japanese Patent Publication No. 29723/73 and the following etching liquid [E-1] of this invention immediately before printing, respectively.

| | [E] | | [E-1] | |
|---|---|---|---|---|
| 1.3-Diethyl-benzimidazoline-2-thion | 1 | g | 1 | g |
| Acrylamide and vinylimidazole copolymer (93:7) | 1 | g | 1 | g |
| Isopropanol | 200 | ml | 200 | ml |
| Glycerine | 20 | ml | 20 | ml |
| Sodium phosphate | — | | 15 | g |
| Cobalt nitrate | — | | 5 | g |
| Ammonium nitrite | — | | 5 | g |
| Water | 300 | ml | 300 | ml |

As a dampening liquid, the following liquid [F] according to Example 2 of Japanese Patent Publication No. 29441/76 and the following liquid [F-1] of the present invention which were diluted to 10 times were used.

| | [F] | | [F-1] | |
|---|---|---|---|---|
| Succinic acid | 6 | g | 6 | g |
| Borax | 8.4 | g | 8.4 | g |
| Sodium sulfate (anhydride) | 25 | g | 25 | g |
| Polyethylene glycol | 60 | g | 60 | g |
| Ethylene glycol | 40 | g | 40 | g |
| Colloidal silica (20% liquid) | 28 | ml | 28 | ml |
| o-Sodium phosphate | — | | 20 | g |
| Cerium nitrate | — | | 2 | g |
| Sodium nitrite | — | | 5 | g |
| Water to make up | 1 | l | 1 | l |
| (PH was adjusted to 5.0) | | | | |

Printing was carried out using an offset printing machine (Type 250 manufactured by Addressograph-Multigraph Corp. in U.S.A.). More than 3,000 clear prints were obtained by using any combinations of [E] + [F] or [F-1] and [E-1] +[F] or [F-1] and especially the latter combination could provide more prints than the former.

However, etching liquid [E] and dampening liquid [F] corroded the metallic portions of the container after the lapse of one week and mold appeared after the lapse of 3 days. Thus, these liquids could not be practically used. On the other hand, when the etching liquid [E-1] and the dampening liquid [F-1] of the present invention were used, the container was not corroded and no mold appeared. Furthermore, these liquids gave no adverse effects on other metallic portions of the printing machine.

EXAMPLE 4

Commercially available PS plates were prepared using aluminum plate as a support and printing was carried out by an offset printing machine using the following etching liquids [E-2]–[E-5] and the dampening liquids prepared by diluting said etching liquids to 15 times with water.

| | [E-2] | | [E-3] | | [E-4] | | [E-5] |
|---|---|---|---|---|---|---|---|
| Sodium hexa-metaphosphate | 15 | g | 15 | | 15 | | — |
| Phosphoric acid | 2 | ml | 2 | | 2 | | 5 |
| Sodium nitrate | 2 | g | 2 | | 2 | | 2 |
| Potassium nitrite | — | | 2 | g | 2 | | 2 |
| Sodium ethyl-enediamine-tetraacetate | — | | — | | 0.1 | g | 0.5 |
| Octylphenoxy-polyethoxy ethanol (surfactant) | 4 | drips | 4 | | 4 | | 4 |
| Water | 100 | ml | 100 | | 100 | | 100 |

All of these etching liquids and dampening liquids were excellent in rendering the plates oil-unreceptive and did not corrode the aluminum plate of the PS plates. However, etching liquid [E-2] and the dampening liquid prepared therefrom were not prevented from corroding the metallic portions such as iron and copper of the printing machine and moreover much mold appeared after several days. On the other hand, etching liquids [E-3]–[E-5] of the present invention showed no such defects and especially [E-4] and [E-5] could be used for a long time.

We claim:

1. A treating liquid composition for treating the surface of lithographic printing plates which essentially consists of (a) a phosphoric acid, (b) nitric acid or a salt thereof, (c) nitrous acid or a salt thereof and (d) aminopolycarboxylate.

2. A treating liquid composition according to claim 1 which additionally contains inorganic fine particles.

3. A treating liquid composition according to claim 1 which additionally contains a polyol compound.

4. A treating liquid composition according to claim 1 wherein the content of (a) is at least about 0.1 g/l, that of (b) is at least 0.1 g/l, that of (c) is at least about 0.01 g/l and that of (d) is about 0.01 g/l–to about 5 g/l.

5. A treating liquid composition according to claim 1 which additionally contains (e) a polyol compound and (f) inorganic fine particles.

6. A treating liquid composition according to claim 5 which consists essentially of (a) sodium o-phosphate, (b) sodium nitrate, (c) sodium nitrite, (d) aminopolycarboxylate, (e) a polyol compound and (f) inorganic fine particles.

7. A treating liquid composition according to claim 5 which consists essentially of (a) at least one member selected from o-phosphoric acid, pyrophosphoric acid, hexametaphosphate and phosphorous acid, (b) at least one of nitric acid and salts thereof, (c) at least one of nitrous acid and salts thereof, (d) aminopolycarboxylate, (e) at least one polyol compound and (f) inorganic fine particles.

8. A treating liquid composition according to claim 3 which additionally contains an alkali metal salt other then an alkali metal salt of nitrous acid or nitric acid.

9. A method of treating the surface of a lithographic printing plate comprising applying to said surface:

a treating liquid composition for treating the surface of lithographic printing plates which essentially consists of (a) a phosphoric acid, (b) nitric acid or a salt thereof, (c) nitrous acid or a salt thereof and (d) aminopolycarboxylate.

10. A method according to claim 9 wherein the treating liquid composition additionally contains inorganic fine particles.

11. A method according to claim 9 wherein the treating liquid composition additionally contains a polyol compound.

12. A method according to claim 9 wherein the treating liquid composition content of (a) is at least about 0.1 g/l, that of (b) is at least about 0.01 g/l, that of (c) is at least about 0.01 g/l and that of (d) is about 0.01 g/l--about 5 g/l.

13. A method according to claim 9 wherein the treating liquid composition additionally contains (e) a polyol compound and (f) inorganic fine particles.

14. A method according to claim 13 wherein the treating liquid composition consists essentially of (a) sodium o-phosphate, (b) sodium nitrate, (c) sodium nitrite, (d) aminopolycarboxylate, (e) a polyol compound and (f) inorganic fine particles.

15. A method according to claim 13 wherein the treating liquid composition consists essentially of (a) at least one member selected from o-phosphate acid, pyrophosphoric acid, hexametaphosphate and phosphorous acid, (b) at least one of nitric acid and salts thereof, (c) at least one of nitrous acid and salts thereof, (d) aminopolycarboxylate, (e) at least one polyol compound and (f) inorganic fine particles.

16. A method according to claim 13 wherein the treating liquid composition additionally contains an alkali metal salt other than an alkali metal salt of nitrous acid or nitric acid.

17. A method according to claim 7 wherein the aminopolycarboxylate is sodium ethylenediamine tetraacetate.

18. A treating liquid according to claim 1 wherein the aminopolycarboxylate is sodium ethylenediamine tetraacetate.

* * * * *